Feb. 11, 1936.  E. GRETENER  2,030,447
MULTICOLOR SCREEN FOR USE WITH LENTICULATED FILMS
Filed Jan. 20, 1934
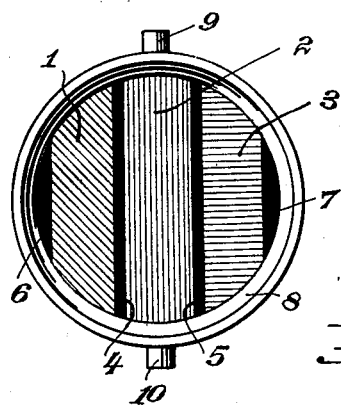
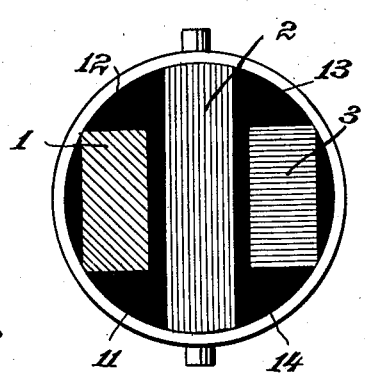
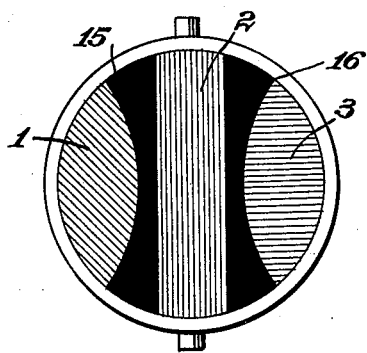
Edgar Gretener
INVENTOR
BY: Gifford, Scull & Burgess
ATTORNEYS.

Patented Feb. 11, 1936

2,030,447

UNITED STATES PATENT OFFICE 2,030,447

MULTICOLOR-SCREEN FOR USE WITH LENTICULATED FILMS

Edgar Gretener, Berlin-Siemensstadt, Germany, assignor to Opticolor Aktiengesellschaft, Glarus, Switzerland, a corporation of Switzerland Application January 20, 1934, Serial No. 707,531
In Germany January 20, 1933

1 Claim. (Cl. 88—16.4)

This invention relates to multicolor screens for use with lenticulated films. Its purpose is to increase the luminosity of such screens without lowering the saturation of the colors.

The new screens are characterized by the fact that the zone of greatest length is colored red. When the zones, as being, for instance, limited by circular lines, are of no definite lengths, the average lengths are employed for choosing the zone which is to be colored red.

Some examples of the new screens are represented in the figures.

The screen in Figure 1 consists of the three zones 1, 2, 3 which are colored green, red and blue, the central one being red. Small strips 4 and 5 impermeable to light are arranged between the zones of the sceen. These zones as well as the segments 6 and 7 concealing the lateral borders of the screen serve for lowering the diffusion of light between the different zones. The screen is held by the ring 8 bearing at two opposite spots the pins 9 and 10 which serve for securing an exact position of the screen with respect to the lenticular elements of the photographic film. The zones of this screen are limited partly by straight and partly by curved lines.

The screen represented in Figure 2 is similar to that of Figure 1, the only difference being that the two marginal zones 1 and 3 are made somewhat smaller by using the diaphragms 11 through 14. Thus for the lateral zones two equal exposures are secured over their whole breadths.

The efficiency of the screen represented in Figure 3 is similar to that of the screen of Figure 2 in consequence of the fact that the diaphragms 15 and 16 are so shaped that the zones 1 and 3 are tapering towards their ends. Thus the screen has the highest luminosity combined with a good resolving of colors, as the centers of gravity have equal distances from each other which distances are equal about to one third of the diameter of the whole screen. This form of the screen is a good means for preventing the light diffusions from disturbing the saturation of the colors.

In all the described screens the longest zone which is the central one is colored red. The advantage of such an arrangement of the colors is seen from the following explanations.

Till now the central zone was green. As it was the longest one its breadth was only about one fourth till one third the breadth of the lateral zones, which fact was in accordance with the spectral sensibility of the emulsion layers. Now the diffusion of light in the photographic layer which takes place as well as during the exposure and during the projection has the consequence that each part of the photographic layer is also influenced by such light which had passed the filter zones corresponding to the neighbouring parts of the layer. By such light diffusions a degradation of colors is effected so that the colors may not be reproduced with the same saturation as they have in nature.

When now the central zone is much smaller than the lateral ones the color of this zone shows a much greater loss of saturation than the other colors.

Besides, the longest zone of the projection screen too had to be much smaller than the other zones when it was green or blue in order to prevent it from prevailing.

Now it could be proved that red is always too weak in the projection of lenticular films when the zones are of about equal areas. This is especially the case when high intensity arc lamps are used, which are necessary for a luminous projection in the great cinemas. This drawback can not be overcome by using a thinner red-filter, as the red dyes become brown when they are too much diluted, so that it is no longer possible to reproduce a satisfactory red. This fault is especially striking when high intensity arc lamps are employed as these lamps generally have a spectrum of about equal energy for all wave-lengths in contradiction to most other light-sources which are most efficient for the longer wave lengths.

It may easily be seen that all these difficulties may be overcome by choosing red for the zone of the greatest length as this zone may have a greater area than the other ones, thus enabling to give to all zones about the same breadth. The advantages of such screens are less degradations of color and the possibility of employing high intensity arc lamps for the projection without being obliged to waste the higher luminosity of such lamps by employing filters absorbing a greater quantity of blue and green in the screen.

When the color zones are not limited by straight lines perpendicular to the stripes which form the said zones, the average length of such a zone is calculated in the following manner:

It is divided into a great number of small strips of equal breadth and running in parallel to the borders between the zones, which direction is generally also parallel to the direction of the cylindrically shaped lenticular elements on the film. The lengths of all these strips are measured and summed up. The sum is divided with the number of the strips from which results the average length of the zone in consideration. Then the zone with the greatest average length is colored red.

I claim as my invention:

A color filter for use with lenticulated films and high intensity lamps emitting light of approximately equal energy for all wave lengths of the spectrum, said filter comprising three zones extending generally parallel to the lenticulations on the films, the filter being circular and the zones being colored green, red, and blue, with the red zone extending substantially diametrically across the filter, and the green and blue zones being disposed generally parallel to the red zone and on opposite sides thereof.

EDGAR GRETENER.